(12) United States Patent
 Pottebaum et al.

(10) Patent No.: US 9,273,729 B2
(45) Date of Patent: Mar. 1, 2016

(54) APPARATUSES AND METHODS HAVING A BEARING SHIELD ARRANGEMENT

(71) Applicant: Seagate Technology LLC, Cupertino, CA (US)

(72) Inventors: Kenneth L. Pottebaum, Lakeville, MN (US); Scott A. Bengtson, Apple Valley, MN (US); David D. Koester, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 93 days.

(21) Appl. No.: 14/043,573

(22) Filed: Oct. 1, 2013

(65) Prior Publication Data
US 2015/0093061 A1    Apr. 2, 2015

(51) Int. Cl.
| | |
|---|---|
| *F16C 33/66* | (2006.01) |
| *F16C 33/78* | (2006.01) |
| *F16C 33/80* | (2006.01) |
| *F16C 43/04* | (2006.01) |

(52) U.S. Cl.
CPC ......... *F16C 33/6659* (2013.01); *F16C 33/7886* (2013.01); *F16C 33/7893* (2013.01); *F16C 33/7896* (2013.01); *F16C 43/04* (2013.01); *Y10T 29/49679* (2015.01)

(58) Field of Classification Search
CPC .. F16C 33/6659; F16C 33/78; F16C 33/7859; F16C 33/80; F16C 33/7869; F16C 33/7886; F16C 33/7896; F16C 33/7846; F16C 19/08; F16C 43/045; F16C 33/7893
USPC ......... 384/474, 477, 480, 486, 488, 490, 504, 384/462; 29/898.11; 360/99
See application file for complete search history.

(56) References Cited

U.S. PATENT DOCUMENTS

| | | | | | |
|---|---|---|---|---|---|
| 2,347,953 | A | * | 5/1944 | Katcher | 277/423 |
| 2,385,306 | A | * | 9/1945 | Shafer | 384/477 |
| 2,639,954 | A | * | 5/1953 | Potter | 384/484 |
| 3,537,725 | A | * | 11/1970 | Frost | 384/480 |
| 3,574,424 | A | * | 4/1971 | Hagemeister | 384/517 |
| 3,841,721 | A |  | 10/1974 | Coutant et al. |  |
| 4,093,324 | A | * | 6/1978 | Carrigan | 384/480 |
| 4,154,447 | A | * | 5/1979 | Francis et al. | 277/420 |
| 4,379,600 | A | * | 4/1983 | Muller | 384/480 |
| 4,395,078 | A | * | 7/1983 | Smith et al. | 384/506 |
| 4,765,688 | A | * | 8/1988 | Hofmann et al. | 301/124.1 |
| 5,482,381 | A |  | 1/1996 | Krum et al. |  |
| 5,560,715 | A | * | 10/1996 | Mosby | 384/477 |
| 5,600,511 | A |  | 2/1997 | Dunfield et al. |  |
| 5,655,845 | A |  | 8/1997 | Lampart |  |
| 5,739,980 | A |  | 4/1998 | Brooks |  |
| 5,841,210 | A |  | 11/1998 | Obara |  |
| 6,010,247 | A |  | 1/2000 | Mouri et al. |  |
| 6,191,924 | B1 |  | 2/2001 | Koester |  |
| 6,371,654 | B1 |  | 4/2002 | Misso |  |
| 6,402,387 | B2 | * | 6/2002 | Obara | 384/480 |

(Continued)

*Primary Examiner* — Marcus Charles
(74) *Attorney, Agent, or Firm* — Crawford Maunu PLLC

(57) ABSTRACT

Various aspects of the present disclosure are directed towards an apparatus/method including rolling elements, an outer ring surrounding an inner ring and the inner and outer rings guiding rotation of the rolling elements in a rotation region therebetween, and a cap secured to the inner ring. The apparatus further includes a bearing shield arrangement secured to one of the outer and inner rings and configured with the other of the outer and inner rings to define a gap for the flow of vapor or lubricant from the rotation region through a vapor restricting pathway.

20 Claims, 6 Drawing Sheets

(56) References Cited

U.S. PATENT DOCUMENTS

| | | |
|---|---|---|
| 6,421,201 B1 | 7/2002 | Khan et al. |
| 6,449,120 B1 * | 9/2002 | Ridenour et al. .......... 360/99.08 |
| 6,527,449 B1 | 3/2003 | Koyama et al. |
| 6,563,243 B2 * | 5/2003 | Obara et al. .................... 310/90 |
| 7,067,463 B2 | 6/2006 | Akiyama |
| 7,072,148 B2 | 7/2006 | Tsuchiya |
| 7,341,379 B2 | 3/2008 | Koyama |
| 8,284,523 B2 | 10/2012 | Schmidt et al. |
| 8,376,626 B2 | 2/2013 | Tsuchiya |
| 2004/0136630 A1 * | 7/2004 | Mori et al. .................... 384/504 |
| 2011/0188796 A1 | 8/2011 | Tsuchiya |
| 2011/0279925 A1 | 11/2011 | Watanabe et al. |
| 2012/0212092 A1 | 8/2012 | Goto et al. |
| 2012/0275056 A1 | 11/2012 | McGuire, Jr. |
| 2012/0275105 A1 | 11/2012 | McGuire, Jr. |
| 2013/0136386 A1 | 5/2013 | Tsuchiya |

* cited by examiner

APPARATUSES AND METHODS HAVING A BEARING SHIELD ARRANGEMENT

SUMMARY

Various example embodiments are directed to one or more of bearings, bearing cartridges, and their implementation.

Various aspects of the present disclosure are directed toward an apparatus including rolling elements, an outer ring surrounding an inner ring, and a bearing shield arrangement. The inner and outer rings guide rotation of the rolling elements in a rotation region therebetween, and a cap is secured to the inner ring. The bearing shield arrangement is secured to one of the outer and inner rings and, with the other of the outer and inner rings, defines a gap for the flow of vapor or lubricant from the rotation region through a vapor restricting pathway. The vapor restricting pathway extends from the gap to a region of the pathway between the bearing shield arrangement and the cap, and from the region of the pathway to another region of the pathway between the cap and the outer ring.

Some embodiments of the present disclosure are directed toward an apparatus including an inner ring, an outer ring surrounding the inner ring, rolling elements, bearing shields, a hubcap, and a vapor restricting pathway. The rolling elements are arranged between the inner ring and the outer ring and exhibit relative rotation between the inner and outer rings. The bearing shields are arranged adjacent the rolling elements, fixedly secured to the outer ring, and extend to a point closely adjacent the inner ring. The hubcap is arranged adjacent to at least one of the bearing shields, and opposite the bearing shield relative to the rolling elements. The hubcap is fixedly arranged to either the inner ring or a shaft fixed to the inner ring. The vapor restricting pathway is defined at least in part by surfaces of the bearing shield, the hubcap, the inner ring and the outer ring, in which the surfaces include opposing surfaces of the hubcap and the outer ring.

One or more embodiments are directed toward a method as follows. Rolling elements are provided in a rotation region between an inner ring and a surrounding outer ring, in which the inner and outer rings guide rotation of the rolling elements therebetween. A bearing shield arrangement is secured to one of the outer and inner rings, and a cap is secured to the other of the outer and inner rings. A gap is provided for the flow of vapor or lubricant from the rotation region through a vapor restricting pathway, which extends from the gap to one region of the pathway between the bearing shield arrangement and the cap, and from the one region of the pathway to another region of the pathway between the cap and the one of the outer and inner rings.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
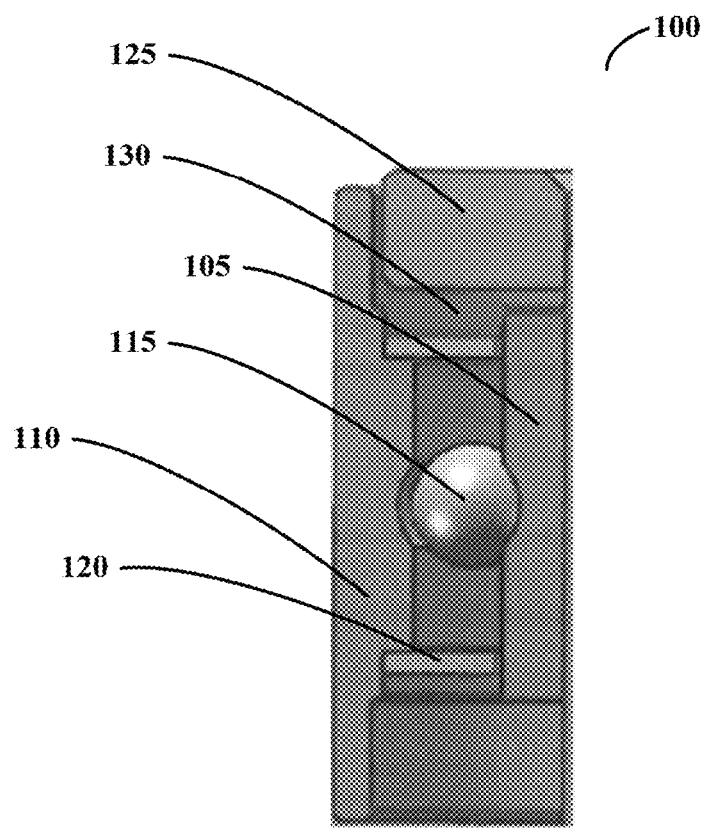
FIG. 1 is a partial cross-sectional view of a bearing, consistent with various aspects of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of devices, systems and arrangements, including those involving long-term use of enclosed storage devices. While the present disclosure is not necessarily so limited, various aspects of the disclosure may be appreciated through a discussion of examples using this context.

Specific embodiments of the present disclosure are believed to be beneficial for implementation with a disc drive type apparatus including complex moving/mechanisms such as pivot bearings, spindle motors, and drive assemblies as described herein. Certain embodiments are directed to the reduction of grease vapor outgassing from a bearing and bearing cartridge in a disc drive actuator assembly and its implementation. In various embodiments, an apparatus and vapor restricting pathway as described herein can be implemented to reduce outgassing by over ten times (e.g., relative to implementations in which a bearing shield is not implemented).

Various embodiments are directed to a disc drive unit having an actuator assembly and an e-block that pivots about a pivot shaft by way of a cartridge bearing assembly. The cartridge bearing assembly contains bearings between inner and outer rings and is packed with lubricant to minimize resistance between the bearing and rings. In use, the heat and motion of the cartridge bearing assembly causes some small particles of grease to vaporize (outgassing). Various aspects are directed to mitigating or preventing this vapor from escaping the cartridge bearing assembly. This approach can be implemented to control the amount of outgassing that enters the interior enclosure of the disc drive, mitigating issues that may arise when such outgassing occurs, such as those relating to the performance and reliability of the head/disc interface (HDI), which can be an important part of disc drive recording systems. For example, such approaches can be used to mitigate interference of small particles with head-to-disc interfaces, and therein avoiding problems that require service/repair of the drive. Accordingly, various embodiments are directed to bearings, bearing cartridges, and their implementation for addressing problems relating to outgassing.

Various aspects of the present disclosure are directed toward an apparatus including rolling elements, an outer ring surrounding an inner ring having a cap secured thereto, with the inner and outer rings guiding rotation of the rolling elements in a rotation region therebetween. The apparatus further includes a bearing shield arrangement secured to one of the outer and inner rings. The bearing shield arrangement defines, with the other of the outer and inner rings, a gap that flows vapor or lubricant from the rotation region through a vapor restricting pathway. The vapor restricting pathway extends from the gap to one region of the pathway between the bearing shield arrangement and the cap, and from the one region of the pathway to another region of the pathway between the cap and the outer ring.

In certain embodiments, a bearing shield arrangement as discussed above extends sufficiently towards the other of outer and inner rings (to which it is not connected) to impede the flow of vapor or lubricant, and the gap is sized to permit the bearing shield arrangement as secured to one of the outer and inner rings to rotate relative to the other of the outer and inner rings. The cap may be implemented as a hubcap and secured to the other of the outer and inner rings.

The inner and outer rings, of the various embodiments of the present disclosure, may take various dimensions. In some embodiments the inner and outer rings may be the same lengths, in others, the inner or outer rings may be longer than the other. More specific embodiments have inner and outer rings that are approximately equal in length. In such an embodiment, a hubcap can be fixed to the inner ring, and arranged between the inner and outer rings. In other embodiments, the outer ring can be longer than the inner ring, and in certain such implementations, a hubcap is fixed to a shaft and arranged between the shaft and the outer ring. In either of the above embodiments, the ensuing vapor restricting pathway employing the various components of the apparatus (in some embodiments a bearing) mitigates and/or prevents the flow of vapor and grease out of the apparatus.

In some embodiments, such a bearing is used in a bearing cartridge assembly that also includes other rolling elements in another rotation region, and another outer ring and another inner ring that provide guide rotation to the other rolling elements within the other rotation region. In some implementations, a sleeve is secured to the outer ring of respective bearings, and provides a desired spacing between the bearings.

In another exemplary embodiment, an apparatus includes an inner ring, an outer ring arranged surrounding the inner ring, rolling elements, bearing shields, a hubcap, and a vapor restricting pathway. The rolling elements are arranged between the inner and outer rings and provide relative rotation between the inner and outer rings. The bearing shields are adjacent the rolling elements, and secured to the outer ring. The bearing shields extend to a point closely adjacent the inner ring, with the hubcap adjacent to at least one of the bearing shields, and opposite the rolling elements. The hubcap can be fixed to either the inner ring, or a shaft fixed to the inner ring. At least part of the surfaces of the bearing shield, the hubcap, the inner ring and the outer ring form the vapor restricting pathway.

Other embodiments of the present disclosure are directed toward methods, as may involve manufacturing and/or using one or more apparatuses as discussed herein. In one such embodiment, rolling elements are provided in a rotation region between an inner ring and a surrounding outer ring. The inner and outer rings guide the rotation of the rolling elements therebetween. A bearing shield arrangement is secured to one of the outer and inner rings and a cap is secured to the other of the outer and inner rings, and defines (at least in part) a gap that flows vapor or lubricant from the rotation region through a vapor restricting pathway. The vapor restricting pathway extends from the gap to one region of the pathway between the bearing shield arrangement and the cap, and from the one region of the pathway to another region of the pathway between the cap and the one of the outer and inner rings. The vapor restricting pathway may be used to reduce (or eliminate) the flow of lubricant and vapor from within the regions of the bearing.

Various aspects of the present disclosure are also further directed towards different aspects of disc drive apparatuses, such as described above, along with related methods of manufacture and uses. For example, various embodiments are directed to the manufacture of the entire disc drive apparatuses and portions thereof such as the e-block and base deck.

Turning now to the figures, some of the benefits and issues addressed by the present disclosure will become apparent with a discussion of the bearing-related components used in an exemplary disc drive apparatus.

FIG. 1 is a partial cross-sectional view of a bearing apparatus 100, consistent with various aspects of the present disclosure. The bearing apparatus 100 includes inner ring 105, outer ring 110 and rolling elements including element 115 between the inner and outer ring, in which the inner and outer rings guide the rotation of the rolling elements. On either side of the rolling elements are bearing shield arrangements 120, which are attached to the outer ring 110 and extend to a point closely adjacent the inner ring 105 (e.g., adjacent such that a gap therein facilitates restricting air flow and vapor flow through the gap). In certain embodiments, the bearing shield arrangements 120 is attached to the inner ring 105 and extend to a point closely adjacent the outer ring 110.

Outer ring 110 is longer in relation to inner ring 105 as shown in the cross-section (e.g., vertically in FIG. 1). This added length allows for an overhang and thus securing of a cap (or hubcap) 125 to the inner ring (and/or a shaft). The opposing surfaces of the inner ring 105, outer ring 110, bearing shield arrangement 120, and cap 125 form a vapor restricting pathway 130. The vapor restricting pathway 130 forms a narrow pathway from which lubricant and vapor must traverse to escape the bearing, the narrow pathway restricting airflow and vapor flow.

Figure 2:
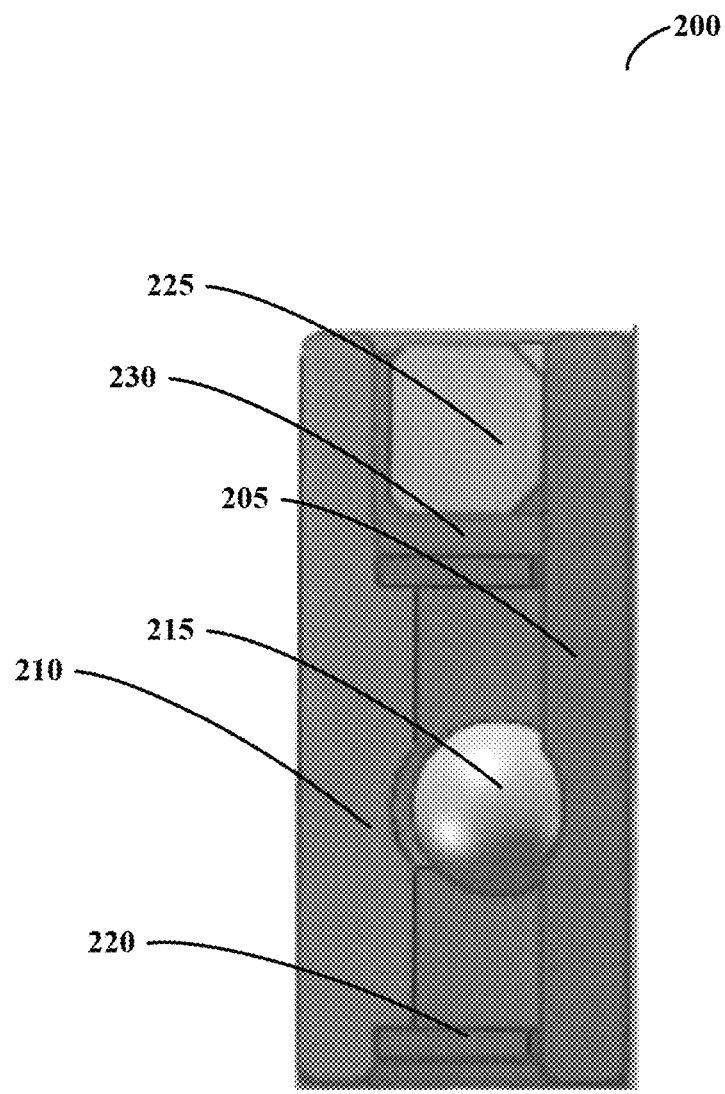
FIG. 2 is a partial cross-sectional view of a bearing, consistent with various aspects of the present disclosure.

FIG. 2 is a partial cross-sectional view of a bearing apparatus 200, consistent with various aspects of the present disclosure. As shown in FIG. 2, the bearing apparatus 200 includes inner ring 205 and outer ring 210 of approximately equal lengths, which form a region in which rolling elements including element 215 are located. A cap 225 is attached to inner ring 205, and can be spaced apart from a shaft operable with the bearing apparatus. A bearing shield arrangement 220 is connected to outer ring 210 and extends from the outer ring toward inner ring 205, and forms a gap region with the inner ring 205. Similar to the embodiment illustrated in FIG. 1, the opposing surfaces of the inner ring 205, outer ring 210, bearing shield arrangement 220, and cap 225 form a vapor restricting pathway 230 via which lubricant and vapor must traverse to escape the bearing apparatus. In some implementations, the cap 225 is assembled as part of the bearing assembly process instead of being assembled as part of the pivot assembly process.

Figure 3:
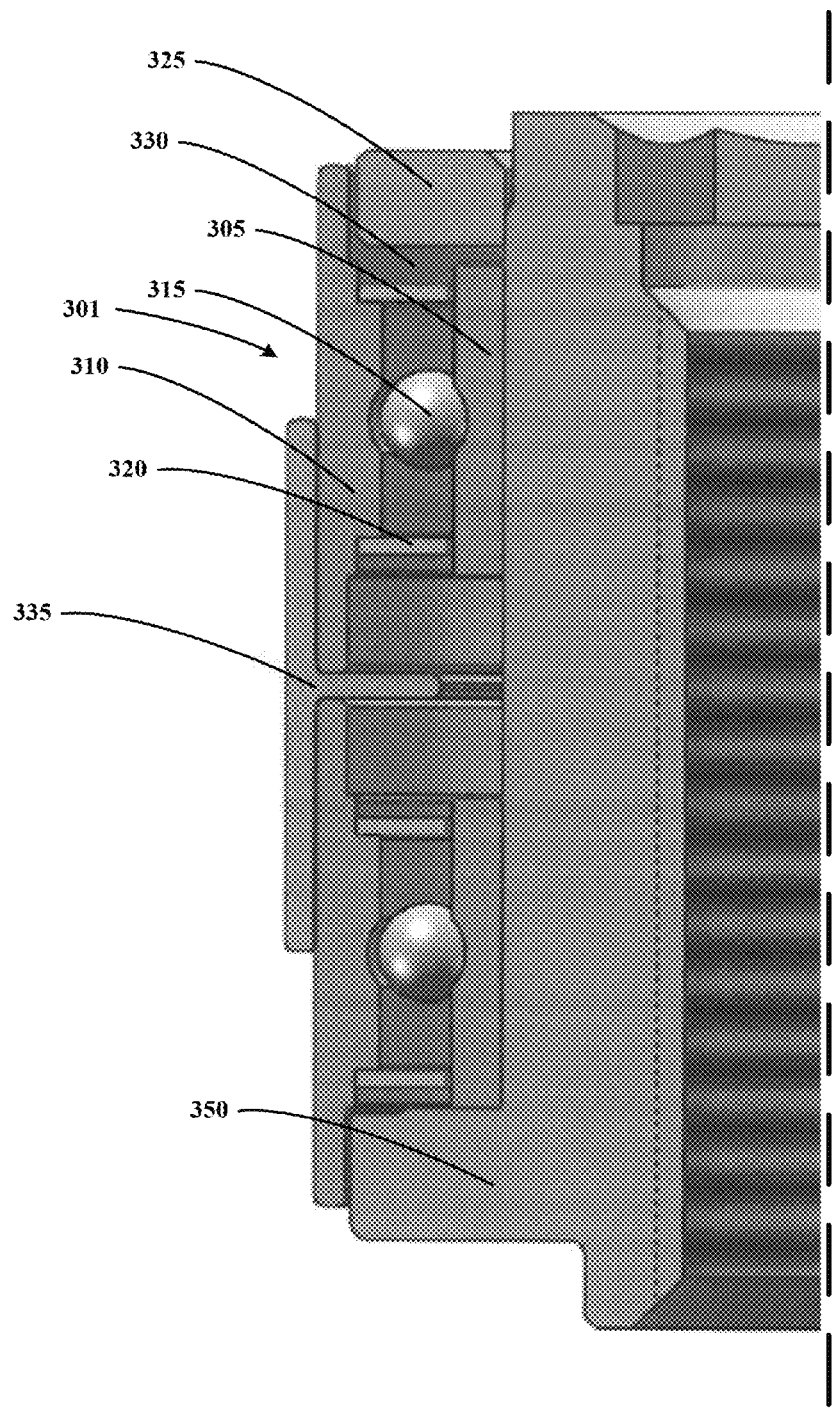
FIG. 3 is a partial cross-sectional view of a bearing cartridge assembly attached to a shaft of a disc drive base deck, consistent with various aspects of the present disclosure.

FIG. 3 is a partial cross-sectional view of a bearing cartridge assembly attached to a shaft of a disc drive base deck, consistent with various aspects of the present disclosure. In various implementations, the embodiment shown in FIG. 3 may be implemented using one or more bearing apparatuses as illustrated in FIG. 1, assembled into a bearing cartridge assembly including two bearings and a sleeve 335. By way of example, an upper cross-section of bearing apparatus 301 includes an inner ring 305, outer ring 310, rolling elements including element 315, bearing shield arrangements 320, and a cap 325. The opposing surfaces of the inner ring 305, outer ring 310, bearing shield arrangement 320, and cap 325 form a vapor restricting pathway 330. Each bearing apparatus is secured to sleeve 335 to form the bearing cartridge assembly, with the size and shape of the sleeve 335 being varied to suit particular embodiments. The bearing cartridge assembly is secured to a shaft 350 of the disc drive base deck, and the cap 325 is secured to the shaft. The bearing cartridge assembly cross-section shows two vapor restricting pathways as shown at 330 on either side of the bearing cartridge assembly. The vapor restricting pathways represent two points of escape for vapor and lubricant from the bearing. As discussed above, the vapor restricting pathways 330 are formed by opposing surfaces creating a narrow pathway, whereby the narrow pathway restricting airflow and vapor flow mitigates outgassing.

In some embodiments, a bearing cartridge assembly as shown in FIG. 3 is implemented with bearing apparatus 301 being the bearing apparatus 200 shown in FIG. 2. In such embodiments, the cap 225 can be assembled as a part of the bearing cartridge assembly.

Figure 4:
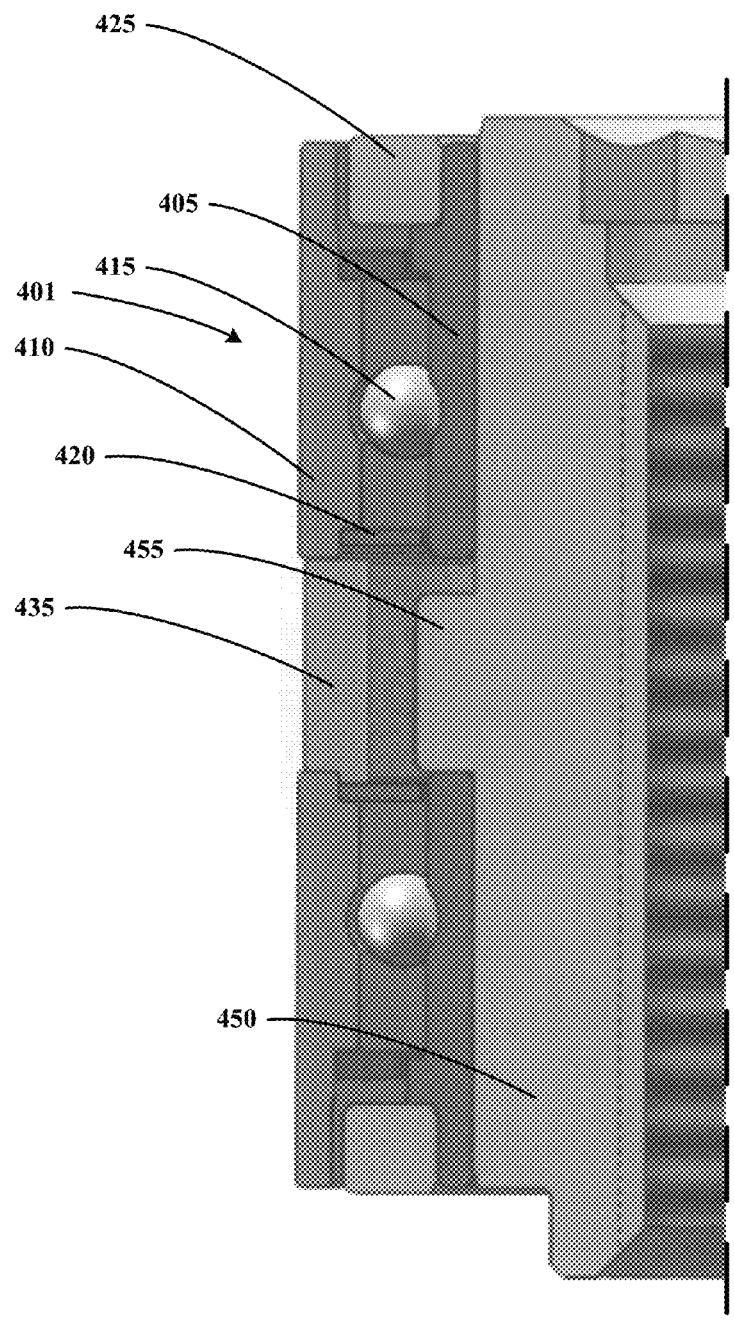
FIG. 4 is a partial cross-sectional view of a bearing cartridge assembly attached to a shaft of a disc drive base deck, consistent with various aspects of the present disclosure.

FIG. 4 is a partial cross-sectional view of a bearing cartridge assembly attached to a shaft of a disc drive base deck, with bearing apparatus 401, consistent with various aspects of the present disclosure. Bearing apparatus 401 includes an inner ring 405, outer ring 410, rolling elements including element 415, bearing shield arrangement 420, and a cap 425, with the bearing shield forming a gap with the inner ring. A shaft 450 (to be attached to the base deck of the disc drive) has an external flange 455, which provides a hard-stop for the installation of at least one of the bearings. In an exemplary installation, the bearing apparatus 401 is secured to the shaft 450 and external flange 455. The sleeve 435 is installed over the shaft 450, approximately over the external flange 455. The top bearing is secured to the shaft 450, whereby the sleeve 435 is held in place.

Figure 5:
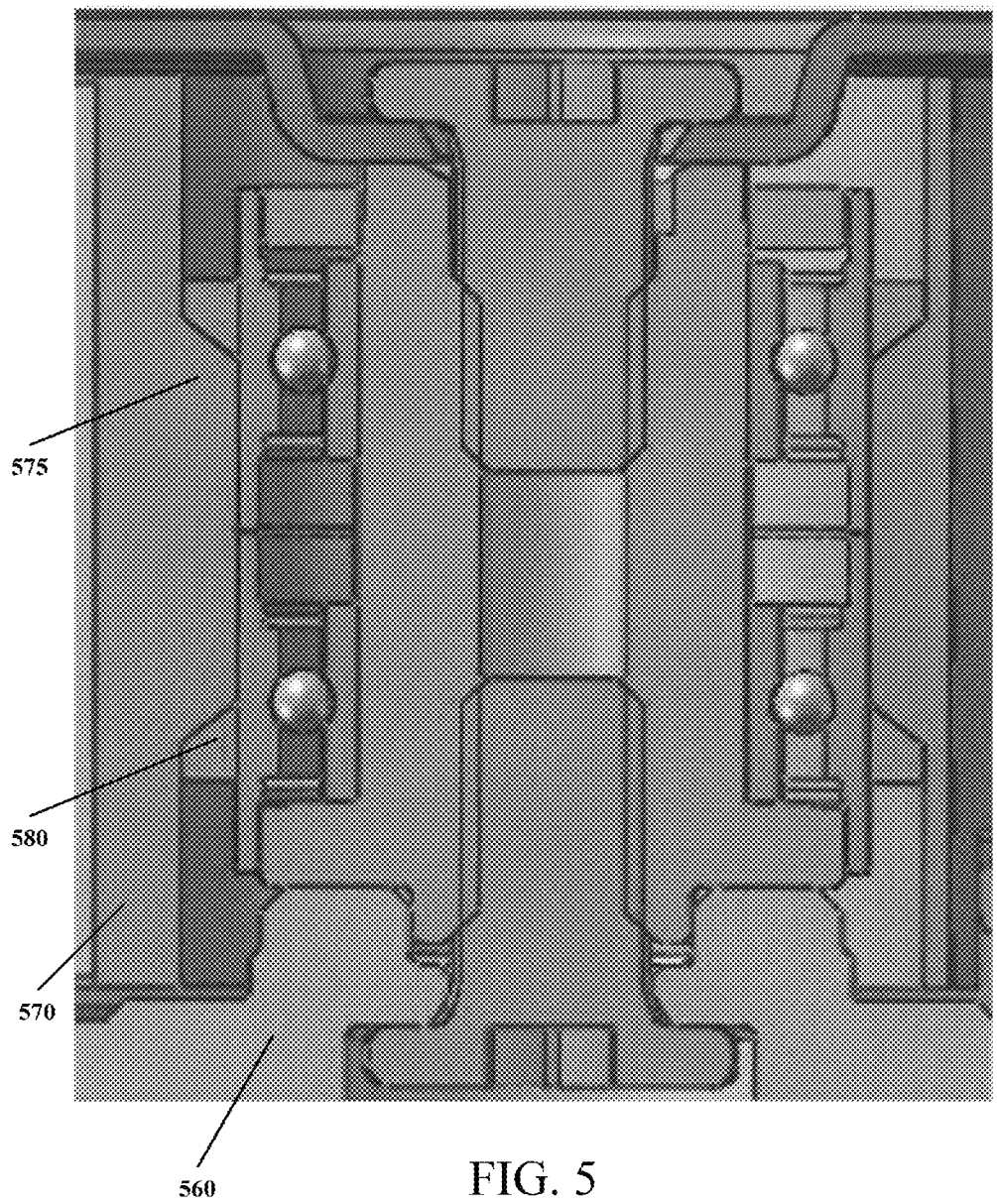
FIG. 5 is a cross-sectional view of a bearing cartridge assembly attached to a shaft of a disc drive base deck, and further attached to an e-block, consistent with various aspects of the present disclosure.

FIG. 5 is a cross-sectional view of a bearing cartridge assembly attached to a shaft of a disc drive base deck, and further attached to an e-block, consistent with various aspects of the present disclosure. A bearing cartridge assembly with bearing apparatuses, which may be implemented in a manner as shown in FIGS. 3 and 4, is secured to a shaft of a disc drive base deck 560. The bearing cartridge assembly is then attached to an e-block 570. By way of example, the bearing cartridge assembly is devoid of a sleeve, and the e-block 570 has an inner diameter defined by an internal flange 575 that creates a gap between the bearing cartridge assembly and the e-block 570. The gap created by the internal flange 575 of the e-block 570 allows for the insertion of an adhesive 580 in the gap between the e-block 570 and the bearing cartridge assembly. The adhesive 580 assists in securing the e-block 570 to the bearing cartridge assembly, and thereby the base deck 560 of the disc drive. In one exemplary embodiment, the adhesive 580 is an Ultra-Violet (UV) curable epoxy, whereby after insertion of the Ultra-Violet (UV) curable epoxy into the gap between the e-block 570 and bearing cartridge assembly, a UV light is directed into the gap to cure the Ultra-Violet (UV) curable epoxy.

Figure 6:
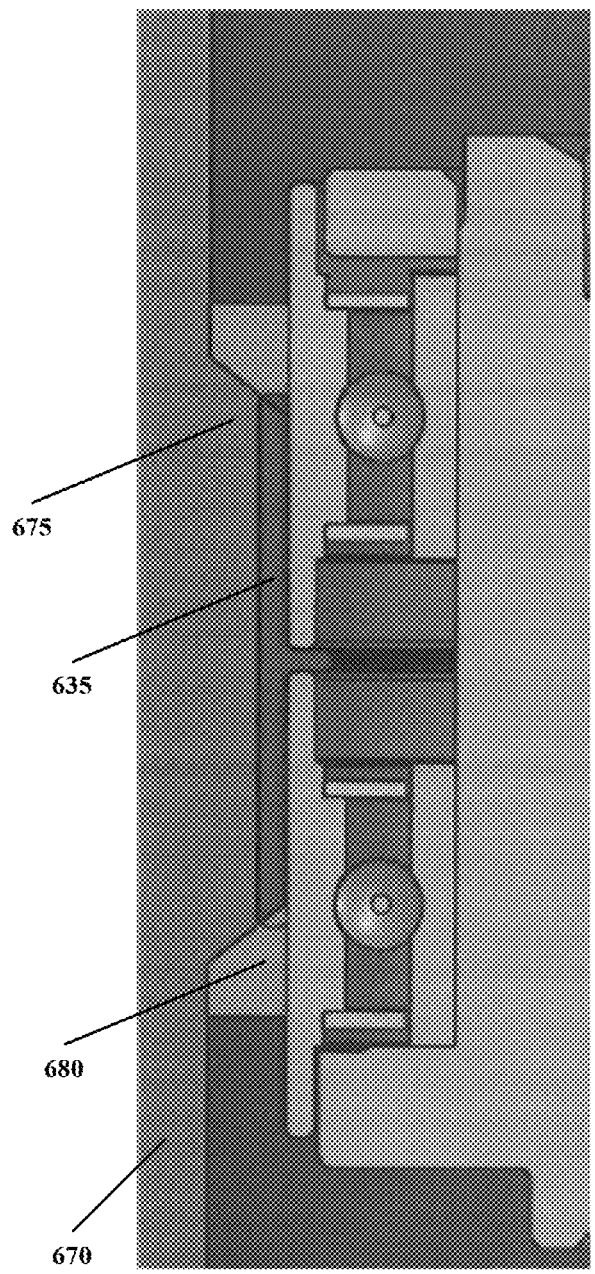
FIG. 6 is a cross-sectional view of a bearing cartridge assembly attached to a shaft of a disc drive base deck, and further attached to an e-block, consistent with various aspects of the present disclosure.

FIG. 6 is a cross-sectional view of a bearing cartridge assembly attached to an e-block 670, consistent with various aspects of the present disclosure. The embodiment shown in FIG. 6 can be implemented with an assembly similar to that shown in FIG. 5, with a sleeve 635 that spaces components of respective bearing apparatus cross-sections from one another, in the bearing cartridge assembly. The sleeve 635, along with the internal flange 675 of the e-block 670 (such as discussed previously in relation to FIG. 5), defines a gap between the bearing cartridge assembly and the e-block 670. The gap defined by the internal flange 675 of the e-block 670 allows for the insertion of an adhesive 680 between the e-block 670 and the bearing cartridge assembly (including sleeve 635). The adhesive 680 assists in securing the e-block 670 to the bearing cartridge assembly, and thereby the base deck of the disc drive. In some embodiments, the e-block does not contain an internal flange as shown and a gap is relative to a thickness of the sleeve between the e-block and bearing cartridge assembly.

Based upon the above discussion and illustrations, those skilled in the art will readily recognize that various modifications and changes may be made to the present disclosure without strictly following the exemplary embodiments and applications illustrated and described herein. For example, the bearing shield and cap can take a number of various forms, shapes, and sizes while still providing the claimed function. Such modifications do not depart from the true spirit and scope of the present disclosure, including that set forth in the following claims.

What is claimed is:

1. An apparatus comprising:
rolling elements;
an outer ring surrounding an inner ring and the inner and outer rings being configured and arranged to guide rotation of the rolling elements in a rotation region therebetween;
a cap secured to the inner ring; and
a bearing shield arrangement having a planar portion and secured to one of the outer and inner rings and configured with the other of the outer and inner rings to define a gap for the flow of vapor or lubricant from the rotation region through a vapor restricting pathway, the vapor restricting pathway extending from the gap to one region of the pathway between the bearing shield arrangement and the cap and from the one region of the pathway to another region of the pathway between the cap and the outer ring, wherein the cap is configured and arranged to be thicker than the planar portion of the bearing shield arrangement.

2. The apparatus of claim 1, wherein the bearing shield arrangement extends, along the planar portion thereof, sufficiently towards the other of the outer and inner rings to impede the flow of vapor or lubricant from the region and to partly define the vapor restricting pathway while the gap is sized and arranged to permit the bearing shield arrangement as secured to one of the outer and inner rings to rotate relative to the other of the outer and inner rings, and wherein the cap is secured to the other of the outer and inner rings and is configured and arranged to be thicker, in terms of width and height, than the planar portion of the bearing shield arrangement.

3. The apparatus of claim 2, wherein: the inner and outer rings are approximately equal in length, the cap is fixedly connected to the inner ring, is arranged between the inner and outer rings, and includes adjacent surfaces respectively defined by the width and height dimensions that partly define the vapor restricting pathway.

4. The apparatus of claim 1, further including other rolling elements in another rotation region, and another outer ring and another inner ring that are configured and arranged to provide guide rotation to the other rolling elements within the other rotation region, and further including a sleeve having a first elongated portion secured to the outer ring and the other outer ring, and a second elongated portion of the sleeve extending perpendicular to the first elongated portion and between the outer ring and the other outer ring.

5. An apparatus comprising:
an inner ring;
an outer ring arranged surrounding the inner ring;
rolling elements arranged between the inner ring and the outer ring and configured for relative rotation between said inner and outer rings;
bearing shields arranged adjacent the rolling elements, fixedly secured to the outer ring, and extending to a point closely adjacent the inner ring;
a hubcap arranged with a first surface adjacent to and facing at least one bearing shield and with another surface extending perpendicular the first surface, and the hubcap being fixedly secured to either the inner ring, or a shaft fixed to the inner ring; and
a vapor restricting pathway defined at least in part by the respective surfaces of the bearing shield and by the hubcap, the inner ring and the outer ring, each of the respective surfaces configured and arranged to guide and permit escape of vapor flow.

6. The apparatus of claim 5, wherein the bearing shields, inner and outer rings, and the at least one hubcap are separated from one another by an air gap and configured to define an elongated portion of the vapor restricting pathway, with the vapor restricting pathway configured and arranged to restrict vapor flow.

7. The apparatus of claim 6, wherein the outer ring is longer than the inner ring and whereby the hubcap is fixedly connected to a shaft, and the hubcap is arranged between the shaft and the outer ring.

8. The apparatus of claim 6, wherein the inner and outer rings are equal lengths and whereby the hubcap is fixedly connected to the inner ring, and the hubcap is arranged between the inner and outer rings.

9. The apparatus of claim 5, further including other rolling elements in another rotation region, and another outer ring and another inner ring that are configured and arranged to provide guide rotation to the other rolling elements within the other rotation region, and further including a sleeve having a first elongated portion secured to the outer ring and the other outer ring, and a second elongated portion of the sleeve extending perpendicular to the first elongated portion and between the outer ring and the other outer ring toward the shaft, wherein the bearing shields, inner and outer rings, and the at least one hubcap are separated from one another by an air gap and configured to define an elongated portion of the vapor restricting pathway, with the vapor restricting pathway configured and arranged to restrict vapor flow, and wherein the outer ring is longer than the inner ring and whereby the hubcap is fixedly connected to a shaft, and the hubcap is arranged between the shaft and the outer ring.

10. The apparatus of claim 5, further including other rolling elements in another rotation region, and another outer ring and another inner ring that are configured and arranged to provide guide rotation to the other rolling elements within the other rotation region, and further including a sleeve configured and secured to the outer ring and the other outer ring, wherein the bearing shields, inner and outer rings, and the at least one hubcap are separated from one another by an air gap and configured to define an elongated portion of the vapor restricting pathway, with the vapor restricting pathway configured and arranged to restrict vapor flow, and wherein the inner and outer rings are equal lengths and whereby the hubcap is fixedly connected to the inner ring, and the hubcap is arranged between the inner and outer rings.

11. A method comprising:
providing rolling elements in a rotation region between an inner ring and a surrounding outer ring wherein the inner and outer rings are configured and arranged to guide rotation thereof therebetween, with a bearing shield arrangement secured to one of the outer and inner rings and a cap secured to the other of the outer and inner rings, and
providing a gap for the flow of vapor or lubricant from the rotation region through a vapor restricting pathway, the vapor restricting pathway extending from the gap to one region of the pathway between a surface of the bearing shield arrangement and an opposing first surface of the cap, along a second surface of the cap extending perpendicular to the first surface and from the one region of the pathway to another region of the pathway between the cap and the one of the outer and inner rings, wherein each of the bearing shield arrangement and the cap has a depth along a dimension perpendicular to the opposing first surface, with the depth of the cap being significantly greater than the depth of the bearing shield arrangement.

12. The method of claim 11, wherein the bearing shield arrangement extends sufficiently towards the other of the outer and inner rings to impede the flow of vapor or lubricant from the rotation region, while the gap is sized and arranged to permit the bearing shield arrangement as secured to one of the outer and inner rings to rotate relative to the other of the outer and inner rings.

13. The method of claim 11, wherein the cap includes a third surface parallel to the opposing first surface and situated along a plane that does not intersect with at least one of the inner and outer rings, wherein the depth of the cap is defined between the first and third surfaces.

14. The method of claim 11, further including controlling the rolling elements in concert with other rolling elements in another rotation region by using another outer ring and another inner ring that are configured and arranged to provide guide rotation to the other rolling elements within the other rotation region, and wherein a sleeve is securely coupled to the outer ring and the other outer ring.

15. The method of claim 14, wherein the sleeve configured and securely coupled to the outer ring and the other outer ring, is further configured to partially cover a portion of the outer rings.

16. The method of claim 14, wherein the rolling elements and sleeve are coupled to a shaft of a base deck, and to an e-block, and wherein:
the rolling elements are secured to the shaft of the base deck, and
the sleeve is secured to a portion of the first bearing assembly, wherein the sleeve at least partially covers a portion of the outer ring of the first bearing assembly.

17. The method of claim 14, wherein a first elongated portion of the sleeve is securely coupled to the outer ring and the other outer ring, and a second elongated portion of the sleeve extends perpendicular to the first elongated portion and between a first bearing assembly and a second bearing assembly, the first bearing assembly including the first-recited rolling elements and the second bearing assembly including the other rolling elements.

18. The method of claim 17, wherein the first and second bearing assemblies and sleeve are coupled to a shaft of a base deck and to an e-block and wherein:
the first bearing assembly is secured to the shaft of the base deck;

the sleeve is secured to a portion of the first bearing assembly, wherein the sleeve at least partially covers a portion of the outer ring of the first bearing assembly;

the second bearing assembly is secured to the shaft of the base deck, and to a portion of the sleeve, wherein the sleeve at least partially covers a portion of the outer ring of the second bearing assembly; and the e-block is secured to the sleeve, wherein the sleeve defines a clearance or gap between another portion of the outer ring of each bearing assembly and an inner surface of the e-block.

19. The method of claim 18, wherein an adhesive in the clearance or gap is between the sleeve and the other portion of each bearing assembly, wherein the sleeve, the bearing assemblies, and the e-block are secured to one another, and wherein the sleeve is configured and securely coupled to the outer ring and the other outer ring, and is further configured to partially cover a portion of the outer rings.

20. The method of claim 17, further including securing the second bearing assembly to a shaft of the base deck, and to a portion of the sleeve, wherein the sleeve at least partially covers a portion of the outer ring of the second bearing assembly.

* * * * *